(12) United States Patent
Vedage et al.

(10) Patent No.: US 8,168,296 B2
(45) Date of Patent: *May 1, 2012

(54) BENZYLATED POLYALKYLENE POLYAMINES AND USES THEREOF

(75) Inventors: Gamini Ananda Vedage, Bethlehem, PA (US); Williams Rene Edouard Raymond, New Tripoli, PA (US); Michael Ian Cook, DeMeern (NL); Robert Marjo Theodoor Rasing, Didam (NL)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/369,422

(22) Filed: Feb. 11, 2009

(65) Prior Publication Data

US 2009/0163676 A1 Jun. 25, 2009

Related U.S. Application Data

(63) Continuation-in-part of application No. 12/186,768, filed on Aug. 6, 2008, which is a continuation-in-part of application No. 11/672,298, filed on Feb. 7, 2007.

(51) Int. Cl.
*B32B 15/092* (2006.01)
*B32B 27/16* (2006.01)
*B32B 27/38* (2006.01)
*C08L 63/00* (2006.01)
*C08L 79/02* (2006.01)

(52) U.S. Cl. ........ 428/418; 428/413; 525/523; 525/526; 528/123; 528/266

(58) Field of Classification Search .......... None
See application file for complete search history.

(56) References Cited

U.S. PATENT DOCUMENTS

| | | | |
|---|---|---|---|
| 3,280,043 A | 10/1966 | Larson, et al. | |
| 3,376,344 A | 4/1968 | Lane et al. | |
| 3,430,679 A | 3/1969 | O'Brien et al. | |
| 3,519,582 A | 7/1970 | Clelford et al. | |
| 3,763,102 A | 10/1973 | Hoffmann et al. | |
| 4,195,152 A | 3/1980 | Floyd | |
| 5,280,091 A | 1/1994 | Dubowik et al. | |
| 5,739,209 A | 4/1998 | Lassila et al. | |
| 5,939,476 A | 8/1999 | Lassila et al. | |
| 2006/0194062 A1* | 8/2006 | Setiabudi et al. | 428/413 |
| 2008/0188591 A1 | 8/2008 | Raymond et al. | |
| 2009/0023846 A1 | 1/2009 | Vedage et al. | |
| 2009/0030125 A1* | 1/2009 | Vedage et al. | 524/186 |
| 2009/0030159 A1 | 1/2009 | Vedage et al. | |
| 2009/0163676 A1 | 6/2009 | Vedage et al. | |

FOREIGN PATENT DOCUMENTS

| | | |
|---|---|---|
| DE | 2651760 A1 | 11/1975 |
| DE | 2853752 A1 | 12/1977 |
| EP | 0 767 189 A2 | 4/1997 |
| EP | 0737702 B1 | 8/2003 |
| EP | 1433775 A2 | 6/2004 |
| EP | 1 956 034 A1 | 8/2008 |
| GB | 2 015 000 A | 9/1979 |
| JP | 52108500 | 10/1977 |
| JP | 02239139 | 9/1990 |
| JP | 03031358 | 12/1991 |
| WO | 2004/049776 A2 | 6/2004 |

OTHER PUBLICATIONS

Reiff, Von M., Natural and Synthetic Odorous Substances With Stimulatory Action on Rats A, Acta Tropica, 1956, pp. 289-318, vol. 13, 4, British Library.

Rehse, Klaus, et al, Alkyl-und Arylalkylderivate von Putrescin, Spermidin and Spermin, Archiv der Pharmazie, 1990, pp. 287-294, vol. 323(5), Weinheim.

Burton, Bruce L, Amine-Blushing, Problems? No Sweat!, Fall 2001 Epoxy Resin Formulators' Meeting of the Society of the Plastics Industry, 2001, 17 pgs.

Tanaka, Y., Synthesis and Characteristics of Epoxides, C. A., May ed., Epoxy Resins Chemistry and Technology, pp. 213-233, Marcel Dekker, 1988.

* cited by examiner

*Primary Examiner* — Michael J Feely
(74) *Attorney, Agent, or Firm* — Michael K. Boyer

(57) ABSTRACT

The present invention provides curing agent compositions comprising benzylated polyalkylene polyamine compounds. Amine-epoxy compositions and articles produced from these amine-epoxy compositions are also disclosed.

21 Claims, No Drawings

US 8,168,296 B2

BENZYLATED POLYALKYLENE POLYAMINES AND USES THEREOF

CROSS-REFERENCE TO RELATED APPLICATIONS

This application is a continuation-in-part of application Ser. No. 12/186,768 filed 6 Aug. 2008 which is a continuation-in-part of application Ser. No. 11/672,298 filed 7 Feb. 2007, the disclosures of which are incorporated herein.

BACKGROUND OF THE INVENTION

The present invention relates generally to benzylated polyalkylene polyamine compounds, curing agent and amine-epoxy compositions derived from such compounds, and articles produced from such compounds and/or compositions.

The uses of epoxy resins which are cured, hardened, and/or crosslinked with amine-based curing agents are well known. These amine-epoxy materials are widely used in applications ranging from coatings, adhesives, and composites, to construction products for concrete, cementitious or ceramic substrates, often referred to as civil engineering applications such as formulations for concrete flooring.

When epoxy resins are cured with neat polyalkylene polyamines such as those based on the ethylenediamine (EDA) homologues, the mixtures will tend to "smoke" or "fume". This describes the protonation of the amine with water or slight acidity present in the surrounding air. This phenomenon is due to the high amine vapor pressure. Many epoxy coatings based on the EDA homologues suffer from problems referred to in the industry as blush, carbamation, carbonation, or exudate. These problems are all due at least in part to incompatibility of the amine curing agent and epoxy resin, which causes phase separation and results in amine migration to the coating surface. At the surface the amine can react with $CO_2$ present in the air resulting in carbamation, and if water is present a carbonation can occur. Whether in the form of carbamation or the greasy layer known as exudate and blush, this surface defect detracts from the appearance of the coating, and can also lead to problems with intercoat adhesion. (See "Amine-blushing problems? No sweat!", Fall 2001 Epoxy Formulators' meeting of the Society of the Plastic Industry by Bruce Burton, 17 pp). The problems also tend to be worse when coatings are applied and cured at low temperature, since this exacerbates amine-epoxy incompatibility. In addition, the coating setting time is extended compared to ambient conditions, which leaves a longer time for amine components to migrate to the coating surface. In the case of a clear coat a ripening time may be applied to achieve a coating with high gloss and clarity. Ripening time or incubation time or induction time is defined as the time between mixing epoxy resin with amine and applying the product onto the target substrate. It could also be defined as the time required for the mix to become clear.

There are numerous amine-based curing agent and amine-epoxy compositions that are employed in the amine-epoxy coating industry; however, none of these known products completely addresses the needs or solves the problems noted above. Accordingly, it is to this end that the present invention is directed.

BRIEF SUMMARY OF THE INVENTION

The present invention discloses curing agent compositions and methods of making such compositions. These curing agent compositions can be used to cure, harden, and/or crosslink an epoxy resin. The present invention comprises curing agent compositions comprising at least one benzylated polyalkylene polyamine having at least three nitrogen atoms, at least three active amine hydrogen atoms and at least one benzyl group, which in one embodiment comprises the reaction product of the reductive amination of a benzaldehyde compound with a polyalkylene polyamine having at least three nitrogen atoms. In another embodiment the at least one benzylated polyalkylene polyamine comprises the reaction product of a benzyl halide with a polyalkylene polyamine having at least three nitrogen atoms.

In another aspect, the present invention provides a curing agent composition comprising the contact product of
  (i) at least one benzylated polyalkylene polyamine having at least three nitrogen atoms, e.g., the reaction product of the reductive amination of a benzaldehyde compound with a polyalkylene polyamine having at least three nitrogen atoms, the benzylated polyamine having at least three active amine hydrogens and at least one benzyl group; and
  (ii) at least one multifunctional amine having three or more active amine hydrogens.

Generally, curing agent compositions of the present invention have an amine hydrogen equivalent weight (AHEW) based on 100% solids from about 30 to about 500.

The present invention, in yet another aspect, provides amine-epoxy compositions. For example, an amine-epoxy composition in accordance with the present invention comprises the reaction product of:
A) a curing agent composition comprising at least one benzylated polyalkylene polyamine having at least three nitrogen atoms, e.g., the reaction product of the reductive amination of a benzaldehyde compound with a polyalkylene polyamine having at least three nitrogen atoms, the benzylated polyalkylene polyamine having at least one benzyl group and at least three active amine hydrogens; and
B) an epoxy composition comprising at least one multifunctional epoxy resin.

As another aspect in accordance with the present invention an amine-epoxy composition comprises the reaction product of:
A) a curing agent composition comprising the contact product of:
  (i) at least one benzylated polyalkylene polyamine having at least three nitrogen atoms, e.g., the reaction product of the reductive amination of a benzaldehyde compound with a polyalkylene polyamine having at least three nitrogen atoms, the benzylated polyalkylene polyamine having at least one benzyl group and at least three active amine hydrogens; and
  (ii) at least one multifunctional amine having 3 or more active amine hydrogens; and
B) an epoxy composition comprising at least one multifunctional epoxy resin.

In a particular embodiment of each of the above aspects the benzylated polyalkylene polyamine is benzylated polyethylene polyamine. Examples of this embodiment are benzylated diethylenetriamine and benzylated triethylenetetramine.

In another particular embodiment of the above aspects the at least one benzylated polyalkylene polyamine component comprises at least 5 wt % dibenzylated polyalkylene polyamines.

Articles of manufacture produced from amine-epoxy compositions disclosed herein include, but are not limited to, adhesives, coatings, primers, sealants, curing compounds, construction products, flooring products, and composite products. Further, such coatings, primers, sealants, or curing compounds can be applied to metal or cementitious substrates.

When the polyalkylene polyamine is benzylated, particularly the polyethylene polyamines, the resultant product has a better compatibility with epoxy resin, particularly with most common epoxy resins based on bisphenol A or bisphenol F as well as polyepoxy novolac resins. The mix of curing agent and epoxy resin often requires no "ripening time" for obtaining contact products with high gloss and clarity. Also smoking or fuming may be decreased or eliminated. Furthermore, the reaction products following reductive benzylation have a lower viscosity which allows benzylation to a point where no free amine is present in the final product. The removal of the free amine helps in reducing the carbamation of the film caused by the reaction of the primary amine in the presence of water and carbon dioxide. The decrease/absence of smoking or fuming; the improved compatibility with epoxy resin; the lower tendency to carbamate; the reduced need for an induction time and the low level of free, unreacted amine in the final product result in improved handling properties.

DEFINITIONS

The following definitions and abbreviations are provided in order to aid those skilled in the art in understanding the detailed description of the present invention.

| | |
|---|---|
| AHEW— | amine hydrogen equivalent weight |
| BA— | benzyl alcohol |
| DETA— | diethylenetriamine, AHEW = 21 |
| DGEBA— | diglycidyl ether of bisphenol-A, EEW 182-192 |
| DEN 431— | bisphenol F novolac epoxy resin from DOW Chemicals |
| DER ™ 331— | liquid DGEBA, from DOW Chemicals |
| EDA— | ethylenediamine |
| EEW— | epoxy equivalent weight |
| Epikote ® 828 (Epon 828)— | liquid epoxy resin, EEW 184-192, from Hexion |
| IPDA— | isophoronediamine, from Degussa AG, AHEW = 43 |
| Am3— | N-3-aminopropyl ethylenediamine |
| Am4— | N,N'-bis(3-aminopropyl) ethylenediamine |
| Am5— | N,N,N'-tris(3-aminopropyl) ethylenediamine |
| PEHA— | pentaethylenehexamine |
| PHR— | parts per hundred weight resin |
| TEPA— | tetraethylenepentamine |
| TETA— | triethylenetetramine, AHEW = 25 |

DETAILED DESCRIPTION OF THE INVENTION

Amine Curing Agent and Epoxy-Amine Compositions

The present invention discloses curing agent compositions and methods of making these curing agent compositions. A curing agent composition in accordance with the present invention can be used to cure, harden, and/or crosslink an epoxy resin. Such curing agent composition comprises a benzylated polyalkylene polyamine having at least three nitrogen atoms, for example, the reductive amination product of a benzaldehyde compound with a polyalkylene polyamine having at least three nitrogen atoms. The preferred embodiment comprises a benzylated polyethylene polyamine. The terms "polyalkylene polyamine" and "polyethylene polyamine" will be used interchangeably throughout the specification in an exemplary manner to further describe the invention.

The degree of benzylation depends on the equivalents ratio of benzaldehyde to reactive amine hydrogens in the polyamine in the reductive amination reaction. Thus, in one aspect of the invention, the curing agent composition comprises a benzylated polyalkylene polyamine component comprising polyamine molecules having one, or two, or three, or four or more benzyl groups, or any combination thereof. In another aspect such benzylated polyalkylene polyamine component for the present invention comprises at least 5 wt % polyamines having at least two benzyl groups, i.e., having two or more benzyl groups. In other aspects of the invention the benzylated polyalkylene polyamine component comprises 10 to 100 wt %, desirably 30 to 100 wt %, benzylated polyamines having two or more benzyl groups. Generally, this curing agent composition has an amine hydrogen equivalent weight (AHEW) based on 100% solids from about 30 to about 500. In a different aspect, the curing agent composition has an AHEW based on 100% solids from about 60 to about 400, or from about 80 to about 300. Further, the curing agent composition can have an AHEW based on 100% solids from about 50 to about 100. In these aspects, the preferred embodiment comprises benzylated polyethylene polyamines.

In another aspect, the present invention provides a curing agent composition comprising the contact product of
  (i) a benzylated polyalkylene polyamine component comprising at least one benzylated polyalkylene polyamine, e.g., the reductive amination product of a benzaldehyde compound with a polyalkylene polyamine having at least three nitrogen atoms, the benzylated polyamine having at least one benzyl group and at least three active amine hydrogens; and
  (ii) at least one multifunctional amine having 3 or more active amine hydrogens.

Again, in another embodiment of this aspect of the invention, the curing agent composition comprises a benzylated polyalkylene polyamine component comprising polyamine molecules having one, or two, or three, or four or more benzyl groups, or any combination thereof. In another aspect such benzylated polyalkylene polyamine component for the present invention comprises at least 5 wt % polyamines having at least two benzyl groups, i.e., having two or more benzyl groups. In other aspects of the invention the benzylated polyalkylene polyamine component comprises 10 to 100 wt %, desirably 30 to 100 wt %, benzylated polyamines having two or more benzyl groups. The curing agent composition in this aspect of the present invention can have an AHEW based on 100% solids from about 30 to about 500. Further, such curing agent composition can have an AHEW based on 100% solids in the range from about 55 to about 450, from about 60 to about 400, from about 70 to about 350, from about 80 to about 300, or from about 90 to about 250. In a different aspect, the curing agent composition has an AHEW based on 100% solids from about 100 to about 200.

If the multifunctional amine is different from the benzylated polyalkylene polyamine, AHEW can be calculated based on its chemical structure, or is often provided by the supplier of the amine in case of a mixture. The AHEW for the benzylated polyalkylene polyamine compound, $AHEW_B$, is determined using the following formula, assuming the polyalkylene polyamine is the reductive amination product of x moles of benzaldehyde, for example, with 1 mole of a polyalkylene polyamine compound, PAPA (the polyalkylene polyamine compound and the benzaldehyde are discussed in greater detail below):

$$AHEW_B = \frac{MW_{PAPA} + x \cdot (MW_{Ald/Ket} - 16)}{f - x};$$

wherein:

MW$_{PAPA}$ is the average molecular weight of the polyalkylene polyamine;

MW$_{Ald/Ket}$ is the molecular weight of the benzaldehyde;

$f$ is the average amine hydrogen functionality of the polyalkylene polyamine; and MW$_{APAPA}$ is the average molecular weight of the benzylated polyalkylene polyamine and can be calculated as follows:

$$MW_{APAPA} = MW_{PAPA} + x \cdot (MW_{Ald/Ket} - 16).$$

In each of the above aspects of the invention the curing agent composition comprises a benzylated polyamine component comprising polyamine molecules having one, or two, or three, or four or more benzyl groups or any combination thereof. Such benzylated polyamine component for the present invention comprises at least 5 wt % polyamines having two or more benzyl groups, preferably 10 to 100 wt %, especially 30 to 100 wt % polyamines having two or more benzyl groups.

Additionally, curing agent compositions described herein can be solvent-based. Alternatively, in another aspect of the present invention, these compositions can further comprise at least one diluent, such as, for example, an organic solvent, or an organic or inorganic acid. Appropriate organic solvents are well known to those skilled in the art of amine formulation chemistry. Exemplary organic solvents suitable for use in the present invention include, but are not limited to, benzyl alcohol, butanol, toluene, xylene, methyl ethyl ketone, and the like, or combinations thereof. Non-limiting examples of organic and inorganic acids are acetic acid, sulfamic acid, lactic acid, salicylic acid, sebacic acid, boric acid, phosphoric acid, and the like, or combinations thereof. Such acids can increase the curing speed of the curing agent composition.

Curing agent compositions of the present invention can be produced with various reactant ratios of benzaldehyde compound to the polyalkylene polyamine compound.

In accordance with the present invention, a method of making a curing agent composition is provided. This method comprises either using the benzylated polyalkylene polyamine composition as a curing agent or formulating it with other alkylated amines, or non-alkylated amines, catalysts, accelerators, non-reactive diluents, solvents and other additives necessary to achieve the required properties of the final curing agent composition.

Curing agent compositions described herein can maintain single phase uniformity for extended periods of time, which can be required for storage of the product and its subsequent use in its intended application. Additionally, if these compositions are substantially free of solvents, they can have substantially no VOCs, which can be beneficial for environmental, health and safety issues, as will be appreciated by those skilled in the art.

The curing agent compositions also can be further modified with monofunctional epoxides, such as, for example, phenyl glycidyl ether, o-cresyl glycidyl ether, p-tert-butylphenyl glycidyl ether, n-butyl glycidyl ether, and other similar glycidyl ethers or esters. Further, curing agent compositions disclosed herein can be blended with other commercially available curing agents. Such commercially available curing agents include, but are not limited to, solvent based, solvent free or water-based curing agents, which can be employed in a blend to target specific properties, such as cure rate, drying speed, hardness development, clarity, and gloss.

The present invention also includes articles of manufacture comprising an amine-epoxy composition as described above. Such articles can include, but are not limited to, an adhesive, a coating, a primer, a sealant, a curing compound, a construction product, a flooring product, a composite product, laminate, potting compounds, grouts, fillers, cementitious grouts, or self-leveling flooring. Additional components or additives can be used together with the compositions of the present invention to produce articles of manufacture. Further, such coatings, primers, sealants, curing compounds or grouts can be applied to metal or cementitious substrates.

The relative amount chosen for the epoxy composition versus that of the curing agent composition, or hardener, can vary depending upon, for example, the end-use article, its desired properties, and the fabrication method and conditions used to produce the end-use article. For instance, in coating applications using certain amine-epoxy compositions, incorporating more epoxy resin relative to the amount of the curing agent composition can result in coatings which have increased drying time, but with increased hardness and improved appearance as measured by gloss. Amine-epoxy compositions of the present invention generally have stoichiometric ratios of epoxy groups in the epoxy composition to amine hydrogens in the curing agent composition ranging from about 1.5:1 to about 0.7:1. For example, such amine-epoxy compositions can have stoichiometric ratios of about 1.5:1, about 1.4:1, about 1.3:1, about 1.2:1, about 1.1:1, about 1:1, about 0.9:1, about 0.8:1, or about 0.7:1. In another aspect, the stoichiometric ratio ranges from about 1.3:1 to about 0.7:1. In yet another aspect, the stoichiometric ratio ranges from about 1.2:1 to about 0.8:1. In still another aspect, the stoichiometric ratio ranges from about 1.1:1 to about 0.9:1.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or formulations described herein. Still further, two or more of the components of the contact product may react to form other components composing the composition. Combining additional materials or components can be done by any method known to one of skill in the art.

Benzylated Polyalkylene Polyamine

Polyalkylene polyamine compounds that are useful in producing the benzylated polyalkylene polyamine compounds of the present invention include, but are not limited to, polyethylene polyamines, polypropylene polyamines, and combinations thereof. Non-limiting examples of polyethylene polyamines include diethylenetriamine (DETA), triethylenetetramine (TETA), tetraethylenepentamine (TEPA), pentaethylenehexamine (PEHA), and other higher polyethylene polyamines. Suitable polypropylene polyamines include, but are not limited to, dipropylenetriamine, tripropylenetetramine, and other higher polypropylene polyamines. It will be recognized by those skilled in the art that polyethylene polyamines containing 4 or more nitrogens are generally available as complex mixtures, most of which contain the same number of nitrogens. Side products in these mixtures are often called congeners. For example, TETA contains not only linear TETA, but also tris-aminoethylamine, N,N'-bis-aminoethylpiperazine, and 2-aminoethylaminoethylpiperazine.

In one aspect of the present invention, the at least one polyalkylene polyamine compound is DETA, TETA, TEPA, PEHA, dipropylenetriamine, tripropylenetetramine or any combination thereof. In another aspect, the at least one polyalkylene polyamine compound is DETA, or TETA, or a mixture of DETA and TETA. Typical mixtures of DETA and TETA are 1 part by weight of DETA to about 0.1 to about 1.1 parts by weight of TETA. In this and other aspects of the present invention, the mixtures of DETA and TETA can be 1 part by weight of DETA to about 0.1, about 0.2, about 0.3, about 0.4, about 0.5, about 0.6, about 0.7, about 0.8, about 0.9, about 1.0, or about 1.1 parts by weight of TETA. For example, DETA/TETA weight ratios of 70/30 and 50/50 are useful in the present invention.

The curing agent compositions comprising at least one benzylated polyalkylene polyamine also can be further modified by adduction with epoxy resins typically used for making adducts, such as novolac epoxide resin, using a stoichiometric excess of the benzylated polyalkylene polyamine. For example, a novolac resin is charged to a benzylated DETA/TETA mixture heated to 80° C. in a stoichiometric ratio of more than one mole benzylated DETA/TETA mixture to one mole of novolac resin. As a more specific example, DEN 431 novolac resin having a functionality of 2.8 is charged to a benzylated DETA/TETA mixture (70:30 wt ratio) heated to 80° C. in a stoichiometric ratio of 2.8 moles amine curing agent composition to 1.0 mole of novolac resin. After adduction the product is cut in xylene/butanol to 70% solids. This adduct affords fast low temperature cure with good surface appearance at 5° C. when used to cure a liquid DGEBA resin.

Benzaldehyde compounds useful in the reductive amination reaction comprise unsubstituted benzaldehyde and substituted benzaldehydes. Substituted benzaldehydes include, but are not limited to, compounds of the formula PhCHO in which the aromatic ring Ph is substituted with one or more of halogen atoms, C1-C4 alkyl, methoxy, ethoxy, amino, hydroxyl or cyano groups. In one aspect the benzaldehyde compound is desirably benzaldehyde and in another aspect it is vanillin.

In one aspect of the present invention, the at least one benzylated polyalkylene polyamine comprises the reductive amination product of a benzaldehyde compound with a polyalkylene polyamine, especially with a polyethylene polyamine.

In accordance with the curing agent compositions and methods of making such compositions disclosed herein, the molar reactant ratio of the benzaldehyde compound to the at least one polyalkylene polyamine compound is in a range from about 0.8:1 to about 3.0:1. In another aspect, the molar reactant ratio is about 0.9:1, about 1:1, about 1.1:1, about 1.2:1, about 1.3:1, about 1.4:1, about 1.5:1, about 1.6:1, about 1.7:1, about 1.8:1, about 1.9:1, or about 2.0:1. In yet another aspect, the molar reactant ratio is in a range from about 0.9:1 to about 1.8:1, or from about 1:1 to about 1.6:1. In a further aspect, the molar reactant ratio of the benzaldehyde compound to the at least one polyalkylene polyamine compound is in a range from about 1.2:1 to about 1.5:1. In yet another aspect the product should retain more than two reactive hydrogens, to allow a proper cross-linking of the epoxy resin. Even at molar reactant ratios of the benzaldehyde compound to the at least one polyalkylene polyamine compound less than 1:1, dibenzylated polyalkylene polyamines are produced albeit in minor amounts. However to afford sufficient amounts of dibenzylated polyalkylene polyamines, molar reactant ratios of the benzaldehyde compound to the at least one polyalkylene polyamine compound of 1:1 to 2.2:1 should be used.

The benzylated polyalkylene polyamines of the present invention can be prepared by the reductive amination of at least one polyalkylene polyamine compound with the benzaldehyde compound. Procedures for the reductive amination of benzaldehyde are well known to those of skill in the art. Generally, these procedures involve condensing the benzaldehyde with the amine, then reducing the intermediate Schiff base. The reduction is typically conducted in the presence of a metal catalyst in a hydrogen-rich atmosphere at pressures above atmospheric pressure. Non-limiting examples of the synthesis of benzylated polyalkylene polyamines in accordance with the present invention are illustrated in Examples 1-6 that follow.

In another aspect of the present invention, the at least one benzylated polyalkylene polyamine comprises the reaction product of a benzyl halide with the at least one polyalkylene polyamine compound. The benzyl halide may be a fluoride, chloride, bromide or iodide. The benzyl group may comprise unsubstituted benzyl or a substituted benzyl group. Substituted benzyl groups include, but are not limited to, radicals of the formula PhCH2- in which the aromatic ring Ph is substituted with one or more of halogen atoms, C1-C4 alkyl, methoxy, ethoxy, amino, hydroxyl or cyano groups. In one aspect the benzyl group is desirably benzyl and in another aspect it is vanillyl.

The benzylated polyalkylene polyamines of the present invention can also be prepared by the reaction of at least one polyalkylene polyamine compound with a benzyl halide. A non-limiting example of the synthesis of benzylated polyalkylene polyamines which can be employed in the present invention is illustrated in Publication IN166475. According to Publication IN166475, benzyl chloride (3.627 L, 31.78 moles) was added in small portions to a cooled solution of anhydrous ethylenediamine (11.160 L, 167.77 moles) in absolute ethanol. This exemplary synthesis of a benzylated polyalkylene polyamine utilized a large molar excess of ethylenediamine. A large molar excess of one reactant is not required, but may be employed, in the practice of this invention. Generally, molar reactant ratios of the at least one benzyl halide compound to the at least one polyalkylene polyamine compound are within a range from about 0.8:1 to about 2:1. In another aspect, the molar reactant ratio is about 0.9:1, about 1:1, about 1.1:1, about 1.2:1, about 1.3:1, about 1.4:1, about 1.5:1, about 1.6:1, about 1.7:1, about 1.8:1, or about 1.9:1. Yet, in another aspect, the molar reactant ratio of the at least one benzyl halide to the at least one polyalkylene polyamine compound is in a range from about 1.2:1 to about 1.5:1. Additionally, those of ordinary skill in the art in the field of this invention readily recognize that other polyalkylene polyamines and benzyl halides, respectively, can be substituted into this general reaction scheme under like conditions and produce additional benzylated polyalkylene polyamine compounds.

In another aspect of this invention, the at least one benzylated polyethylene polyamine compound has the formula:

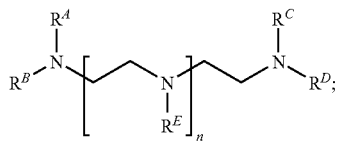

wherein $R^A$ is substituted or unsubstituted benzyl; $R^B$, $R^C$, $R^D$, and $R^E$ are independently $R^A$ or a hydrogen atom; n is 1, 2, 3, 4, 5, 6, or 7, provided that the benzylated polyamine has at least three active amine hydrogen atoms. In another aspect, n in the above formula is 1, 2, 3, or 4. In both of these aspects, $R^A$ may preferably be benzyl or vanillyl, especially benzyl. In a desired embodiment of both of these aspects n is 1 or 2. In yet another aspect of the present invention, the benzylated polyethylene polyamine compound is of the above formula, wherein $R^A$ is benzyl or vanillyl, especially benzyl, $R^B$, $R^C$, $R^D$, and $R^E$ are hydrogen atoms; and n is 1, 2, 3, or 4. In a further aspect $R^A$ and $R^C$ are benzyl or vanillyl, especially benzyl, $R^B$, $R^D$, and $R^E$ are hydrogen atoms; and n is 1, 2, 3, or 4. In other embodiments of these aspects, n is 1 or 2.

Given the many possible locations on the polyalkylene polyamine compound where the benzyl group can replace a hydrogen atom, the product resulting from the reductive reaction of at least one polyalkylene polyamine compound and benzaldehyde compound or from the reaction with benzyl chloride is necessarily a mixture of many different species, where some of the $R^B$, $R^C$, $R^D$, and $R^E$ groups are hydrogen and others are benzyl groups. Which and how many of the "R" groups are converted from hydrogen to benzyl groups depends on many factors, among those being the reaction conditions, catalyst selection, reactants ratio, choice of reactant (specific halide compound or benzaldehyde compound), and the like. For example, using a benzaldehyde compound as the reactant in a molar reactant ratio of benzaldehyde to the polyalkylene polyamine compound of between about 1:1 to about 2:1, the major component of the reaction product is where $R^A$ is benzyl, $R^C$ is benzyl or a hydrogen atom, and $R^B$, $R^D$ and $R^E$ are hydrogen atoms.

Multifunctional Amine

Curing agent compositions in accordance with the present invention can comprise at least one multifunctional amine. Multifunctional amine, as used herein, describes compounds with amine functionality and which contain three (3) or more active amine hydrogens.

Non-limiting examples of multifunctional amines that are within the scope of the present invention include, but are not limited to, an aliphatic amine, a cycloaliphatic amine, an aromatic amine, a Mannich base derivative of an aliphatic amine, a cycloaliphatic amine, or an aromatic amine, a polyamide derivative of an aliphatic amine, a cycloaliphatic amine, or an aromatic amine, an amidoamine derivative of an aliphatic amine, a cycloaliphatic amine, or an aromatic amine, an amine adduct derivative of an aliphatic amine, a cycloaliphatic amine, or an aromatic amine, and the like, or any combination thereof.

More than one multifunctional amine can be used in the compositions of the present invention. For example, the at least one multifunctional amine can comprise an aliphatic amine and a Mannich base derivative of a cycloaliphatic amine. Also, the at least one multifunctional amine can comprise one aliphatic amine and one different aliphatic amine.

Exemplary aliphatic amines include polyethyleneamines (EDA, DETA, TETA, TEPA, PEHA, and the like), polypropyleneamines, aminopropylated ethylenediamines (Am3, Am4, Am5, and the like), aminopropylated propylenediamines, 1,6-hexanediamine, 3,3,5-trimethyl-1,6-hexanediamine, 3,5,5-trimethyl-1,6-hexanediamine, 2-methyl-1,5-pentanediamine (commercially available as Dytek®-A), and the like, or combinations thereof. In one aspect of this invention, the at least one multifunctional amine is EDA, DETA, TETA, TEPA, PEHA, propylenediamine, dipropylenetriamine, tripropylenetetramine, Am3, Am4, Am5, N-3-aminopropyl-1,3-diaminopropane, N,N'-bis(3-aminopropyl)-1,3-diaminopropane, N,N,N'-tris(3-aminopropyl)-1,3-diaminopropane, or any combination thereof. Additionally, the poly(alkylene oxide) diamines and triamines commercially available under the Jeffamine name from Huntsman Corporation, are useful in the present invention. Illustrative examples include, but are not limited to, Jeffamine® D-230, Jeffamine® D-400, Jeffamine® D-2000, Jeffamine® D-4000, Jeffamine® T-403, Jeffamine® EDR-148, Jeffamine® EDR-192, Jeffamine® C-346, Jeffamine® ED-600, Jeffamine® ED-900, Jeffamine® ED-2001, and the like, or combinations thereof.

Cycloaliphatic and aromatic amines include, but are not limited to, 1,2-diaminocyclohexane, 1,3-diaminocyclohexane, 1,4-diaminocyclohexane, hydrogenated ortho-toluenediamine, hydrogenated meta-toluenediamine, metaxylylene diamine, hydrogenated metaxylylene diamine (referred to commercially as 1,3-BAC), isophorone diamine, various isomers or norbornane diamine, 3,3'-dimethyl-4,4'-diaminodicyclohexyl methane, 4,4'-diaminodicyclohexyl methane, 2,4'-diaminodicyclohexyl methane, a mixture of methylene bridged poly(cyclohexyl-aromatic)amines, and the like, or combinations thereof. The mixture of methylene bridged poly(cyclohexyl-aromatic)amines is abbreviated as either MBP-CAA or MPCA, and is described in U.S. Pat. No. 5,280,091, which is incorporated herein by reference in its entirety. In one aspect of the present invention, the at least one multifunctional amine is a mixture of methylene bridged poly(cyclohexyl-aromatic)amines (MPCA).

Mannich base derivatives can be made by the reaction of the above described aliphatic amines, cycloaliphatic amines, or aromatic amines with phenol or a substituted phenol and formaldehyde. An exemplary substituted phenol used to make Mannich bases with utility in the present invention is cardanol, which is obtained from cashew nut shell liquid. Alternatively, Mannich bases can be prepared by an exchange reaction of a multifunctional amine with a tertiary amine containing a Mannich base, such as tris-dimethylaminomethylphenol (commercially available as Ancamine® K54 from Air Products and Chemicals, Inc.) or bis-dimethylaminomethylphenol. Polyamide derivatives can be prepared by the reaction of an aliphatic amine, cycloaliphatic amine, or aromatic amine with dimer fatty acid, or mixtures of a dimer fatty acid and a fatty acid. Amidoamine derivatives can be prepared by the reaction of an aliphatic amine, cycloaliphatic amine, or aromatic amine with fatty acids. Amine adducts can be prepared by the reaction of an aliphatic amine, cycloaliphatic amine, or aromatic amine with an epoxy resin, for example, with the diglycidyl ether of bisphenol-A, the diglycidyl ether of bisphenol-F, or epoxy novolac resins. The aliphatic, cycloaliphatic, and aromatic amines also can be adducted with monofunctional epoxy resins, such as phenyl glycidyl ether, cresyl glycidyl ether, butyl glycidyl ether, other alkyl glycidyl ethers, and the like.

Multifunctional Epoxy Resin

Amine-epoxy compositions of the present invention comprise the reaction product of a curing agent composition and an epoxy composition comprising at least one multifunctional epoxy resin. Multifunctional epoxy resin, as used herein, describes compounds containing 2 or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference.

One class of epoxy resins suitable for use in the present invention comprises the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl)propane, 2,2-bis-(4-hydroxyphenyl)-propane (commercially known as bisphenol A), bis-(4-hydroxyphenyl)-methane (commercially known as bisphenol F, and which may contain varying amounts of 2-hydroxyphenyl isomers), and the like, or any combination thereof. Additionally, advanced dihydric phenols of the following structure also are useful in the present invention:

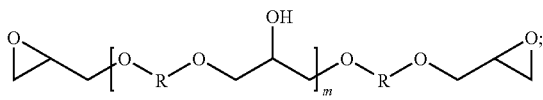

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present invention.

In another aspect, epoxy novolac resins, which are the glycidyl ethers of novolac resins, can be used as multifunctional epoxy resins in accordance with the present invention. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products ranges from about 450 to 3000 or more. Because these products are solid at room temperature, they are often referred to as solid epoxy resins.

DGEBA or advanced DGEBA resins are often used in coating formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature. Generally, multifunctional resins with EEW's based on solids of about 160 to about 750 are useful in the prevent invention. In another aspect the multifunctional epoxy resin has an EEW in a range from about 170 to about 250.

Depending upon the end-use application, it can be beneficial to reduce the viscosity of the compositions of the present invention by modifying the epoxy component. For example, the viscosity can be reduced to allow an increase in the level of pigment in a formulation or composition while still permitting easy application, or to allow the use of a higher molecular weight epoxy resin. Thus, it is within the scope of the present invention for the epoxy component, which comprises at least one multifunctional epoxy resin, to further comprise a monofunctional epoxide. Examples of monoepoxides include, but are not limited to, styrene oxide, cyclohexene oxide, ethylene oxide, propylene oxide, butylene oxide, and the glycidyl ethers of phenol, cresols, tert-butylphenol, other alkyl phenols, butanol, 2-ethylhexanol, $C_4$ to $C_{14}$ alcohols, and the like, or combinations thereof. The multifunctional epoxy resin can also be present in a solution or emulsion, with the diluent being water, an organic solvent, or a mixture thereof.

Miscellaneous Additives

Compositions of the present invention can be used to produce various articles of manufacture. Depending on the requirements during the manufacturing of or for the end-use application of the article, various additives can be employed in the formulations and compositions to tailor specific properties. These additives include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof. It is understood that other mixtures or materials that are known in the art can be included in the compositions or formulations and are within the scope of the present invention.

Articles

The present invention also is directed to articles of manufacture comprising the compositions disclosed herein. For example, an article can comprise an amine-epoxy composition which comprises the reaction product of a curing agent composition and an epoxy composition. The curing agent composition can comprise the contact product of at least one multifunctional amine having 3 or more active amine hydrogens and the benzylated polyalkylene polyamine. The epoxy composition can comprise at least one multifunctional epoxy resin. Optionally, various additives can be present in the compositions or formulations used to produce fabricated articles, dependent upon the desired properties. These additives can include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof.

Articles in accordance with the present invention include, but are not limited to, a coating, an adhesive, a construction product, a flooring product, or a composite product. Coatings based on these amine-epoxy compositions can be solvent-free or can contain diluents, such as water or organic solvents, as needed for the particular application. Coatings can contain various types and levels of pigments for use in paint and primer applications. Amine-epoxy coating compositions comprise a layer having a thickness ranging from 40 to 400 µm (micrometer), preferably 80 to 300 µm, more preferably 100 to 250 µm, for use in a protective coating applied on to metal substrates. In addition, for use in a flooring product or a construction product, coating compositions comprise a layer having a thickness ranging from 50 to 10,000 µm, depending on the type of product and the required end-properties. A coating product that delivers limited mechanical and chemical resistances comprises a layer having a thickness ranging from 50 to 500 µm, preferably 100 to 300 µm; whereas a coating product such as for example a self-leveling floor that delivers high mechanical and chemical resistances comprises a layer having a thickness ranging from 1,000 to 10,000 µm, preferably 1,500 to 5,000 µm.

Numerous substrates are suitable for the application of coatings of this invention with proper surface preparation, as is well known to one of ordinary skill in the art. Such substrates include, but are not limited to, concrete and various types of metals and alloys, such as steel and aluminum. Coatings of the present invention are suitable for the painting or coating of large metal objects or cementitious substrates including ships, bridges, industrial plants and equipment, and floors.

Coatings of this invention can be applied by any number of techniques including spray, brush, roller, paint mitt, and the like. In order to apply very high solids content or 100% solids coatings of this invention, plural component spray application equipment can be used, in which the amine and epoxy components are mixed in the lines leading to the spray gun, in the spray gun itself, or by mixing the two components together as they leave the spray gun. Using this technique can alleviate limitations with regard to the pot life of the formulation, which typically decreases as both the amine reactivity and the solids content increases. Heated plural component equipment can be employed to reduce the viscosity of the components, thereby improving ease of application.

Construction and flooring applications include compositions comprising the amine-epoxy compositions of the present invention in combination with concrete or other materials commonly used in the construction industry. Applications of compositions of the present invention include, but are not limited to, its use as a primer, a deep penetrating primer, a coating, a curing compound, and/or a sealant for new or old concrete, such as referenced in ASTM C309-97, which is incorporated herein by reference. As a primer or a sealant, the amine-epoxy compositions of the present invention can be applied to surfaces to improve adhesive bonding prior to the application of a coating. As it pertains to concrete and cementitious application, a coating is an agent used for application on a surface to create a protective or decorative layer or a coat. Crack injection and crack filling products also can be prepared from the compositions disclosed herein. Amine-epoxy compositions of the present invention can be mixed with cementitious materials such as concrete mix to form polymer or modified cements, tile grouts, and the like. Non-limiting examples of composite products or articles comprising amine-epoxy compositions disclosed herein include tennis rackets, skis, bike frames, airplane wings, glass fiber reinforced composites, and other molded products.

In a particular use of the invention these curing agent compositions will have applicability in making epoxy filament-wound tanks, infusion composites such as windmill blades, aerospace adhesives, industrial adhesives, as well as other related applications. A composite is a material made of different substances, and in the case of resin technologies, composites refer to resin impregnated systems where the resin is reinforced by the addition of reinforcing materials such as fillers and fibers for improving general properties of the resulting product. These materials work together but are not soluble in one another. In the present case, the binder component comprises the epoxy resin and epoxy curing agent(s). There are many types of composite applications such as prepegs, laminates, filament windings, braiding, pultrusion, wet lay and infusion composites. Resin infusion, or resin transfer, is a process by which resin is introduced to the composite mold, the reinforcement material having already been placed into the mold and closed prior to resin introduction. There are variations on this process such as those that are vacuum assisted.

An advantage of the use of benzylated polyalkylene polyamines in amine-epoxy compositions for making composites is the longer pot life and improved compatibility versus the unmodified aliphatic polyamines like TETA. The short pot life of unmodified aliphatic polyamines like TETA make them barely workable for filament winding and infusion applications. Curing agents like TETA start to cure before the processing is completed, leading to poor wet out and dry spots that are failure points. TETA is used for hand lay-up composites where long pot life is not needed, but generally not for resin infusion. Using TETA for filament winding (pipes) is a very manual process with significant EH&S concerns (the TETA and epoxy resin is mixed, then the workers take cups of the mixture from a dispenser and manually pour them over the winding glass fibers and run their gloved hands along the pipe to run the liquid onto the winding pipe). With longer pot life the process could be automated with a bath.

EXAMPLE 1

Synthesis of Benzylated Diethylenetriamine (DETA) at a 1.2:1 Molar Ratio 340.6 g of DETA (3.24 moles) and 5 g of Pd/C catalyst were placed in a 1-liter autoclave batch reactor. The reactor was sealed and subsequently purged with nitrogen and then with hydrogen to remove any air from the reactor. Over about 15 to 20 minutes, 420.2 g of benzaldehyde (3.96 moles) were added to the reactor. After the addition of the benzaldehyde was complete, the reactor contents were stirred for an additional 15 minutes or until the reaction was complete, at which time the reaction exotherm began to subside. At this point, the reactor was pressurized to 0.8.2 MPa (120 psi) with hydrogen and the reactor was heated to 80° C. When the rate of hydrogen uptake slowed, the pressure was increased to 5.44 MPa (800 psi) and the temperature was increased to 120° C. The hydrogenation process continued until the rate of hydrogen uptake fell below 0.0034 MPa/min (0.5 psi/min). The total hydrogenation time was about 5 hours. The reactor was cooled to 60° C. and depressurized, and the reaction product was filtered to remove the catalyst. Water was removed using a rotary-evaporator operating under 20 mm Hg vacuum and temperatures up to 120° C. The resulting reaction product was benzylated DETA, with viscosity, AHEW, theoretical amine value, and actual (measured) amine value properties as shown in Table 1.

EXAMPLES 2-3

Synthesis of Benzylated Diethylenetriamine (DETA) at Varying Molar Ratios

Examples 2-3 utilized the same process as described in Example 1. The molar ratio of benzaldehyde to DETA was 1.5:1 for Example 2 and 2:1 for Example 3. These reactant ratios are indicated by the degree of alkylation in Table 1 which also shows the resulting viscosity, AHEW, theoretical amine value, and actual (measured) amine value properties.

EXAMPLES 4-6

Synthesis of Benzylated Triethylenetetramine (TETA) at Varying Molar Ratios

Example 4 to 6 utilized the same process as described in Example 1, but with TETA as the polyalkylene polyamine compound. The molar reactant ratios are indicated by the degree of alkylation in Table 1 which also shows the resulting viscosity, AHEW, theoretical amine value, and actual (measured) amine value properties.

TABLE 1

Synthesis of Benzylated Polyalkylene Polyamines

| | Example | | |
|---|---|---|---|
| | 1 | 2 | 3 |
| Amine(s) used | DETA | DETA | DETA |
| Amine ratio | 100 | 100 | 100 |
| Degree of benzylation | 1.2:1 | 1.5:1 | 2:1 |
| Amine quantity (g) | 340.6 | 309.6 | 240.5 |
| Benzaldehyde (g) | 420.2 | 477 | 495 |
| Pd/C catalyst (g) | 5 | 6.2 | 3.6 |
| Viscosity at 25° C. (mPa · s) | 30.2 | 36.4 | 49.1 |
| AHEW | 51.8 | 68 | 94.3 |
| Theoretical Amine value (mg KOH/g) | 797 | 707 | 595 |
| Actual Amine value (mg KOH/g) | 776 | 697 | 600 |

| | Example | | |
|---|---|---|---|
| | 4 | 5 | 6 |
| Amine(s) used | TETA | TETA | TETA |
| Amine ratio | 100 | 100 | 100 |
| Degree of benzylation | 1.1:1 | 1.5:1 | 2:1 |
| Amine quantity (g) | 292 | 292 | 326.7 |
| Benzaldehyde (g) | 233 | 318 | 497.8 |
| Pd/C catalyst (g) | 5.0 | 5.0 | 10 g (Pt/C) |
| Viscosity at 25° C. (mPa · s) | 98.0 | 135 | 423 |
| AHEW | 51 | 62 | 82 |
| Theoretical Amine value (mg KOH/g) | 916 | 799 | 688 |
| Actual amine value (mg KOH/g) | 850 | 760 | 595 |

Preparation and Testing of Coatings

Hardener mixtures were prepared by combining and mixing the components given in the tables that follow. They were then thoroughly mixed with DGEBA (DER 331, EEW 182-192, Dow Chemical Co.) at the use level (PHR) indicated.

Clear coatings for drying time measured by BK recorder and hardness development measured by Persoz pendulum hardness were applied to standard glass panels whereas clear coatings for specular gloss were applied to uncoated, matte paper charts (AG5350, Byk).

Coatings were applied at 75 micron WFT (wet film thickness) using a Bird applicator resulting dry film thicknesses from 60 to 70 microns.

Films were cured at 5° C. and 60% RH (relative humidity) or 25° C. and 60% RH using Weiss climate chamber (type WEKK0057). Persoz hardness data were measured at the times indicated.

Clear coatings for impact resistance testing were applied to respectively on cold-rolled steel test panels, ground one side (size 0.8×76×152 mm), using a 75 WFT wire bar. Films were cured according to the following schedules: (A) 14 days ambient temperature (approximately 23° C.); and (B) 14 days ambient temperature cure followed by 2 hour cure at 80° C. Dry film thicknesses were from 60 to 70 microns following schedule A or B.

Coating properties were measured using the test methods described in Table 2.

TABLE 2

Test Methods

| Property | Response | Test Method |
|---|---|---|
| Drying Time: BK Recorder | Thin film set times, phases 2 & 3 (h) | ASTM D5895 |
| Specular Gloss | Gloss at 20° and 60° | ISO 2813, ASTM D523 |
| Persoz Pendulum Hardness | Persoz hardness (s) | ISO 1522, ASTM D4366 |
| Impact Resistance - Tubular Impact Tester | Direct and reverse impact (kg · cm) | ISO 6272, ASTM D2794 |

Mix viscosity was determined using a Rheolab MC20 apparatus (Physica) equipped with a Viscotherm VT10 water bath and MC20 temperature control unit. The equipment was set up with the TEK 150 cone-plate and connected to a desktop computer. After the apparatus had equilibrated at 25.0° C., the gap between the cone (MK22) and plate was set to 50 µm. Samples were equilibrated at 25° C. 24 hr before use. After mixing as indicated, excess product running out of the gap was removed and rotation viscosity of the mixed product was recorded at $200^{-1}$ s shear rate after 30 s.

Gelation time, or gel-time, was recorded as the time after mixing epoxy resin part A and hardener part B to reach a defined point of viscosity as determined using a Techne GT3 Gelation Timer, equipped with disposable glass or steel plungers (13 mm in diameter) and operating at one cycle per minute. Samples were equilibrated during 24 hr at room temperature before use. Gelation time was recorded for 150 g mixture of part A and B and charged to a 250 ml glass jar and left to react at ambient temperature conditions (25° C.).

COMPARATIVE EXAMPLES 7-12

Formulations and coatings of comparative Examples 7-12 are shown in Tables 3-4.

Examples 7-8 used unmodified polyalkylene polyamines and exhibited short gelation times and coatings with tacky finish. Further these coatings demonstrated low gloss and no pendulum hardness could be determined after 1 day cure. Coatings of Examples 10-11 were based on unmodified polyalkylene polyamines formulated with a plasticizer and still yielded low gloss values when cured at 25° C. or 10° C.

Example 9 used neat IPDA mixed with DGEBA and demonstrated long gelation time for good workability and resulted in coatings with high gloss and good initial pendulum hardness. The coating based on Example 9 demonstrated long gelation time and fast cure speed. It is well-known to those skilled in the art that Example 9 requires incorporation of a plasticizer in order to afford ambient cure coatings with good mechanical properties. This was exemplified by comparing impact resistance data following ambient temperature cure (i.e., schedule A) of Examples 9 and 12. The coating based on Example 9 exhibited inferior impact resistance when compared to Example 12. Further the coating based on Example 12 demonstrated moderate gloss when cured at 10° C.

TABLE 3

Comparative Examples 7-12 cured at 25° C.

| | Example | | |
|---|---|---|---|
| | 7 | 8 | 9 |
| Hardener Composition (PHR) | DETA 100 | TETA 100 | IPDA 100 |
| PHR with DGEBA | 11 | 13 | 23 |
| Mix Viscosity (mPa · s) | — | — | — |
| Gelation Time (minute) | 25[a] | 30[a] | 100 |
| Thin Film Set Time (h) Phase 2/Phase 3 | >12/>24 | >12/>24 | 2.2/3.8 |
| Appearance | | | |
| Visual | Tacky coating | Tacky coating | High gloss |
| Specular Gloss 20°/60° | nd[b] | Nd[b] | 86/93 |
| Persoz Hardness (s) | | | |
| Day 1/Day 7 | nd[b]/— | nd[b]/— | 360/— |
| Impact Resistance (kg · cm) Direct/Reverse | | | |
| Schedule A | —/— | —/— | <5/<5 |
| Schedule B | —/— | —/— | —/— |

| | Example | | |
|---|---|---|---|
| | 10 | 11 | 12 |
| Hardener Composition (PHR) | DETA 70 BA 30 | TETA 70 BA 30 | IPDA 70 BA 30 |
| PHR with DGEBA | 16 | 19 | 33 |
| Mix Viscosity (mPa · s) | — | 6,260 | 2,140 |
| Gelation Time (minute) | — | 21 | 52 |
| Thin Film Set Time (h) Phase 2/Phase 3 Appearance | —/— | 3.9/4.5 | 3.1/4.6 |
| Visual | Matte finish | Matte finish | High gloss |
| Specular Gloss 20°/60° | 9/25 | 15/37 | 97/99 |
| Persoz Hardness (s) | | | |
| Day 1/Day 7 | —/— | 41/98 | 211/318 |
| Impact Resistance (kg · cm) Direct/Reverse | | | |
| Schedule A | 50/<5 | 42/<5 | 37/<5 |
| Schedule B | 75/<5 | 53/<5 | 105/33 |

[a] at 21° C.
[b] nd—not determined; tacky coating

TABLE 4

Comparative Examples 11-12 cured at 5° C.

| | Example | |
|---|---|---|
| | 11 | 12 |
| Thin Film Set Time (h) | | |
| Phase 2/Phase 3 Appearance | 14/17 | 9.8/16 |
| Visual | Matte finish | Satin gloss |
| Specular Gloss 20°/60° Persoz Hardness (s) | 5/27 | 45/86 |
| Day 1/Day 7 | 58/114 | 80/196 |

EXAMPLES 13-20

Properties of Coatings Based on Benzylated DETA and TETA

Formulations and coating properties of Examples 13-20 were based on benzylated DETA and TETA and are shown in Tables 5-6.

Examples 13-14 used benzylated DETA and TETA of Examples 1 and 4. Coatings based on Examples 13-14 demonstrated long gelation time with DGEBA while providing short thin film set times and high pendulum hardness after day 1. The coating based on Example 14 provided high gloss after 1 day cure. Further, the higher PHR of Examples 13-14 relative to the unmodified polyalkylene polyamines reduced the relative error in mix ratio with epoxy resin. This combination of properties allows improved handling properties and was exemplified when compared with Examples 7-8.

Examples 15-17 used benzylated DETA of Example 1, 2 and 3, respectively, mixed with benzyl alcohol. Coatings based on Examples 15-16 demonstrated long gelation time in combination with short thin film set time and high pendulum hardness after 1 day cure. Further, these coatings provided improved gloss values. This was exemplified when comparing coatings of Examples 15-17 with comparative Examples 10-11.

Examples 18-20 used benzylated TETA of Example 4, 5 and 6, respectively, mixed with benzyl alcohol. The coating based on Example 18 demonstrated long gelation time in combination with short thin film set time and high pendulum hardness after 1 day cure. The coatings based on Examples 18-19 provided excellent gloss both at 25° C. and at 10° C. This was exemplified when comparing coatings of Examples 18-20 with comparative Examples 11-12.

Coatings based on Example 15-17 provided excellent impact resistance. This was exemplified when comparing impact resistance following schedules A or B of Examples 15-17 with comparative Examples 10-12.

TABLE 5

Inventive examples 13-20 cured at 25° C.

| | Example | | | |
|---|---|---|---|---|
| | 13 | 14 | 15 | 16 |
| Hardener Composition (PHR) | Ex. 1 100 | Ex 4 100 | Ex. 1 70 BA 30 | Ex. 2 70 BA 30 |
| PHR with DGEBA | 28 | 27 | 40 | 52 |
| Mix Viscosity (mPa · s) | — | 2,050 | — | — |
| Gelation Time (minute) | 71 | 56 | 34 | 37 |
| Thin Film Set Time (h) | | | | |
| Phase 2/Phase 3 Appearance | 3.8/4.5 | 3.6/4.6 | 3.5/4.0 | Nd |
| Visual | | High gloss | | |
| Specular Gloss 20°/60° | —/— | 75/100 | —/— | —/— |
| Persoz Hardness (s) | | | | |
| Day 1/Day 7 | 318/341 | 287/349 | 195/251 | 189/278 |
| Impact Resistance (kg · cm) Direct/Reverse | | | | |
| Schedule A | —/— | —/— | 200/75 | 150/50 |
| Schedule B | —/— | —/— | >200/>200 | >200/>200 |

TABLE 5-continued

Inventive examples 13-20 cured at 25° C.

| | Example | | | |
|---|---|---|---|---|
| | 17 | 18 | 19 | 20 |
| Hardener Composition (PHR) | Ex. 3 70 BA 30 | Ex. 4 70 BA 30 | Ex. 5 70 BA 30 | Ex. 6 70 BA 30 |
| PHR with DGEBA | 72 | 39 | 47 | 63 |
| Mix Viscosity (mPa · s) | — | 1,890 | — | 3,320 |
| Gelation Time (minute) | 40 | 32 | — | 52 |
| Thin Film Set Time (h) | | | | |
| Phase 2/Phase 3 Appearance | nd | 4.0/4.9 | —/— | 8.0/9.6 |
| Visual | | High gloss | | High gloss |
| Specular Gloss 20°/60° | —/— | 90/100 | —/— | 104/104 |
| Persoz Hardness (s) | | | | |
| Day 1/Day 7 | 24/83 | 251/338 | —/— | —/— |
| Impact Resistance (kg · cm) Direct/Reverse | | | | |
| Schedule A | 90/14 | 49/<5 | —/— | 37/<5 |
| Schedule B | 180/40 | —/— | —/— | 60/<5 | nd—not determined; poor substrate wetting and disturbed coating surface

TABLE 6

Examples 13-16 cured at 5° C.

| | Example | | | |
|---|---|---|---|---|
| | 13 | 14 | 15 | 16 |
| Thin Film Set Time (h) | | | | |
| Phase 2/Phase 3 Appearance | 10/12 | 12/14 | 15/16 | 19/>24 |
| Visual | | High gloss | High gloss | High gloss |
| Specular Gloss 20°/60° | —/— | 93/100 | 99/102 | 101/102 |
| Persoz Hardness (s) | | | | |
| Day 1/Day 7 | —/117 | 60/114 | 41/69 | Nd | nd—not determined; poor substrate wetting (varying coating thickness)

COMPARATIVE EXAMPLES 10-12 AND INVENTIVE EXAMPLES 15 and 17-20

Coating Appearance as a function of induction time.

Examples 15 and 17-20 illustrate coating appearance by specular gloss obtained from exemplary formulations and coatings utilizing compositions comprising the benzylated DETA and TETA of Examples 1-6. Comparative Examples 10-12 illustrate coating appearance using unmodified DETA and TETA and unmodified IPDA.

Coating appearance properties of comparative Examples 10-12 and inventive Examples 15 and 17-20 are shown in Tables 7-8. For this, coatings were applied to uncoated, matte paper charts after allowing an induction time between 5 and 30 minutes. Coating appearance was measured by specular gloss following 7 days cure at the temperatures indicated. Specular gloss provides a quantitative measure for the level of surface defects occurring in the cured coating.

The coatings of Examples 15 and 17-20 exhibited high gloss following short induction times. This was exemplified by comparing the gloss values of Examples 15 and 17-20 with coatings of Examples 10-11. Examples 10-11 demonstrated low gloss values, even after allowing long induction times up to 30 minutes. This was further exemplified when comparing the coating properties of Examples 10-11 with 15 and 17-20 at 10° C.

The coatings of Examples 19-20 demonstrated excellent gloss with induction times of less than 10 minutes, even when cured at low temperature condition. This was exemplified when comparing Examples 19-20 with Example 12 cured at 25° C. and 10° C. The coating of Example 12 demonstrated high gloss at 25° C. but required induction times significantly longer than 10 minutes when cured at 10° C. in order to obtain similar high gloss values.

TABLE 7

Comparative Examples 10-12 and inventive Examples 15 and 17-20 at 25° C.

| | Example | | | |
|---|---|---|---|---|
| | 10 | 11 | 12 | 15 |
| PHR with DGEBA | 19 | 19 | 33 | 40 |
| Specular Gloss 20°/60° Time into pot-life | | | | |
| 5 minutes | 4/19 | 5/26 | 92/98 | 13/60 |
| 10 minutes | 9/25 | 4/28 | 94/98 | 20/58 |
| 15 minutes | —/— | 12/44 | 94/98 | —/— |
| 20 minutes | 15/51 | 50/71 | 95/99 | 32/67 |
| 30 minutes | 17/32 | 54/75 | 94/99 | 68/83 |

| | Example | | | |
|---|---|---|---|---|
| | 17 | 18 | 19 | 20 |
| PHR with DGEBA | 72 | 39 | 47 | 63 |
| Specular Gloss 20°/60° Time into pot-life | | | | |
| 5 minutes | 45/91 | 20/46 | 65/98 | 99/103 |
| 10 minutes | 56/92 | 43/92 | 87/96 | 101/105 |
| 15 minutes | —/— | 48/92 | 92/94 | 103/105 |
| 20 minutes | 79/100 | 33/92 | 93/95 | 101/105 |
| 30 minutes | 79/100 | 63/100 | 95/97 | 100/105 |

TABLE 8

Comparative Examples 10-12 and inventive Examples 15 and 17-20 at 10° C.

| | Example | | | |
|---|---|---|---|---|
| | 10 | 11 | 12 | 15 |
| Specular Gloss 20°/60° Time into pot-life | | | | |
| 5 minutes | 3/28 | 3/27 | 34/67 | 62/95 |
| 10 minutes | 3/28 | 4/33 | 45/86 | 75/95 |
| 15 minutes | —/— | 6/47 | 71/90 | —/— |
| 20 minutes | 12/39 | 30/67 | 78/94 | 75/93 |
| 30 minutes | 24/36 | 57/85 | 89/94 | 90/100 |

| | Example | | | |
|---|---|---|---|---|
| | 17 | 18 | 19 | 20 |
| Specular Gloss 20°/60° Time into pot-life | | | | |
| 5 minutes | 28/60 | 41/88 | 86/102 | 80/103 |
| 10 minutes | 77/90 | 60/98 | 76/102 | 80/102 |
| 15 minutes | —/— | 68/99 | 87/102 | 99/104 |
| 20 minutes | 85/96 | 74/99 | 90/103 | 99/105 |
| 30 minutes | 93/98 | 76/100 | 81/100 | 100/105 |

EXAMPLE 21

Benzylated DETA/TETA-Novolac Epoxy Resin Adduct 652.4 g (2.8 moles) of benzylated DETA/TETA (70/30 mix with a degree of benzylation 1.3) were charged under nitrogen into a two-lifter flask and 616.8 g xylene were added. The mixture was heated to 80° C. and then 493.0 g (1.0 mole) of 2.8-functional Novolac resin (DOW DEN 431) were added over 3 hours. After the addition was complete, the reaction mixture was allowed to stir at 80° C. for one more hour. This stoichiometric adduction lead to no gelation and to an adduct product with a viscosity of approximately 2,500 mPa·s and amine value of 275 mg KOH/g at 65% solids. The adduct was evaluated in a clear coat formulation. The formulation in parts by weight and performance data are shown in Table 9.

EXAMPLE 22

Benzylated DETA/TETA-Liquid Epoxy Resin Adduct 466.0 g (2.0 moles) of benzylated DETA/TETA (70/30 mix with a degree of benzylation 1.3) were charged under nitrogen into a two-litter flask and 358.3 g xylene were added. The mixture was heated to 80° C. and then 370 g (1.0 mole) of multifunctional liquid epoxy resin (DER 331) were added over 2 hours. After the addition was complete the reaction mixture was allowed to stir at 80° C. for one more hour. This stoichiometric adduction lead to no gelation and to a product with a viscosity of 2000 mPa·s and amine value of 300 mg KOH/g at 70% solids. The adduct was evaluated in a clear coat formulation. The formulation in parts by weight and performance data are shown in Table 9.

TABLE 9

Performance Properties of Clear Coats - Ex 21 and 22 Adducts

| | | Run | | |
|---|---|---|---|---|
| | | A | B | C |
| Example 21 adduct | | 100 | | |
| Example 22 adduct | | | 100 | 96 |
| DER 331 | | 100 | 100 | 100 |
| Anchor K54 | | | | 4 |
| Xylene/Butanol (2:1) | | 12.5 | 13 | 13 |
| Mix Viscosity | mPa·s | 1000 | 1000 | 1000 |
| Dry Speed @ 25° C. | | | | |
| Set to Touch | Hrs | 2 | 2 | 1.5 |
| Thumb twist | Hrs | 3.5 | 4.5 | 3.0 |
| Dry Speed @ 5° C. | | | | |
| BK - Thin Film Set (phase III) | Hrs | 16 | 21 | 15 |
| Set to Touch | Hrs | 6 | 7 | 6 |
| Thumb twist | Hrs | 21 | 21 | 20 |
| Carbamation Resistance | | Excellent | Excellent | Excellent |

The invention claimed is:

1. A curing agent composition comprising (a) at least one benzylated polyalkylene polyamine and (b) at least one multifunctional amine; wherein the at least one benzylated polyalkylene polyamine has the formula:

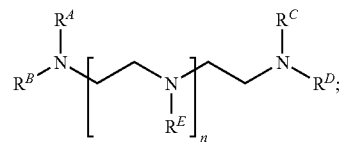

wherein $R^A$ is benzyl; $R^C$ is benzyl or hydrogen; $R^B$, $R^D$, and $R^E$ are hydrogen atoms; n is 1, 2, 3, or 4; and wherein the at least one multifunctional amine comprises at least one member selected from the group consisting of ethylenediamine (EDA), diethylenetriamine (DETA), triethylenetetramine (TETA), tetraethylenepentamine (TEPA), pentaethylenehexamine (PEHA), propylenediamine, dipropylenetriamine, tripropylenetetramine, N-3-aminopropyl ethylenediamine (Am3), N,N'-bis(3-aminopropyl) ethylenediamine (Am4), N,N,N'-tris(3-aminopropyl) ethylenediamine (Am5); N-3-aminopropyl-1,3-diaminopropane, N,N'-bis(3-aminopropyl)-1,3-diaminopropane, N,N,N'-tris(3-aminopropyl)-1,3-diaminopropane, and any combination thereof.

2. The composition of claim 1, wherein the at least one benzylated polyalkylene polyamine comprises the reductive amination product of a benzaldehyde compound with at least one polyalkylene polyamine.

3. The composition of claim 2, wherein the at least one polyalkylene polyamine compound is diethylenetriamine (DETA), triethylenetetramine (TETA), tetraethylenepentamine (TEPA), pentaethylenehexamine (PEHA), or any combination thereof.

4. The composition of claim 2, wherein the at least one polyalkylene polyamine compound is diethylenetriamine (DETA), triethylenetetramine (TETA), or a mixture of diethylenetriamine (DETA) and triethylenetetramine (TETA).

5. The composition of claim 2, wherein the at least one polyalkylene polyamine compound comprises a mixture of diethylenetriamine (DETA) and triethylenetetramine (TETA).

6. The composition of claim 2, wherein the molar reactant ratio of the benzaldehyde compound to the at least one polyalkylene polyamine compound is in a range from about 0.8:1 to about 2:1.

7. The composition of claim 1 wherein the at least one benzylated polyalkylene polyamine comprises the reaction product of a benzyl halide compound with at least one polyalkylene polyamine.

8. The composition of claim 1 wherein the benzylated polyalkylene polyamine comprises at least 5 wt % dibenzylated polyamines.

9. The composition of claim 1, wherein the curing agent composition has an amine hydrogen equivalent weight (AHEW) based on 100% solids from about 50 to about 500.

10. A curing agent composition comprising (a) an amine-epoxide adduct and (b) at least one multifunctional amine having 3 or more active amine hydrogens; wherein the amine-epoxide adduct comprises a reaction product of an epoxide resin and at least one benzylated polyalkylene polyamine having at least three nitrogen atoms, at least three active amine hydrogen atoms and at least one benzyl group; wherein the at least one benzylated polyalkylene polyamine comprises the reductive amination product of a benzaldehyde compound with at least one polyalkylene polyamine; and wherein the at least one polyalkylene polyamine compound comprises a mixture of diethylenetriamine (DETA) and triethylenetetramine (TETA).

11. The curing agent of claim 10 wherein the epoxy resin comprises an epoxy novalac resin.

12. A curing agent composition comprising (a) an amine-epoxide adduct and (b) at least one multifunctional amine having 3 or more active amine hydrogens; wherein the amine-epoxide adduct comprises a reaction product of an epoxide resin and at least one benzylated polyalkylene polyamine having at least three nitrogen atoms, at least three active amine hydrogen atoms and at least one substituted or unsubstituted benzyl group.

13. The composition of claim 12, wherein the at least one benzylated polyalkylene polyamine has the formula:

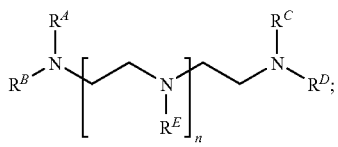

wherein $R^A$ is substituted or unsubstituted benzyl; $R^B$, $R^C$, $R^D$, and $R^E$ are independently $R^A$ or a hydrogen atom; n is 1, 2, 3, 4, 5, 6, or 7, provided that the polyamine has at least three active amine hydrogen atoms.

14. An amine-epoxy composition comprising the reaction product of:
A) a curing agent composition comprising: at least one benzylated polyalkylene polyamine having at least three nitrogen atoms, at least three active amine hydrogen atoms and at least one benzyl group; and at least one multifunctional amine comprising at least one member selected from the group consisting of ethylenediamine (EDA), diethylenetriamine (DETA), triethylenetetramine (TETA), tetraethylenepentamine (TEPA), pentaethylenehexamine (PEHA), propylenediamine, dipropylenetriamine, tripropylenetetramine, N-3-aminopropyl ethylenediamine (Am3), N,N'-bis(3-aminopropyl) ethylenediamine (Am4), N,N,N'-tris(3-aminopropyl) ethylenediamine (Am5); N-3-aminopropyl-1,3-diaminopropane, N,N'-bis(3-aminopropyl)-1,3-diaminopropane, N,N,N'-tris(3-aminopropyl)-1,3-diaminopropane, and any combination thereof; and
B) an epoxy composition comprising at least one multifunctional epoxy resin.

15. The composition of claim 14, wherein the stoichiometric ratio of epoxy groups in the epoxy composition to amine hydrogens in the curing agent composition is in a range from about 1.3:1 to about 0.7:1.

16. An article of manufacture comprising the composition of claim 14.

17. The article of claim 16, wherein the article is an adhesive, a coating, a primer, a sealant, a curing compound, a construction product, a flooring product, or a composite product.

18. The article of claim 16, wherein the article is a coating, primer, sealant, or curing compound which is applied to a metal or cementitious substrate.

19. The amine-epoxy composition of claim 14 wherein the at least one benzylated polyalkylene polyamine has the formula:

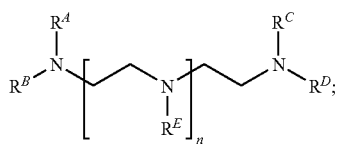

wherein $R^A$ is benzyl, $R^C$ is benzyl or hydrogen; $R^B$, $R^D$, and $R^E$ are hydrogen atoms; n is 1, 2, 3, or 4.

20. An amine-epoxy composition comprising the reaction product of:
A) a curing agent composition comprising an amine-epoxide adduct which comprises a reaction product of an epoxide resin and at least one benzylated polyalkylene polyamine having at least three nitrogen atoms, at least three active amine hydrogen atoms and at least one substituted or unsubstituted benzyl group and;
B) an epoxy composition comprising at least one multifunctional epoxy resin.

21. The composition of claim 20, wherein the at least one benzylated polyalkylene polyamine has the formula:

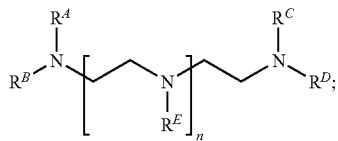

wherein $R^A$ is substituted or unsubstituted benzyl; $R^B$, $R^C$, $R^D$, and $R^E$ are independently $R^A$ or a hydrogen atom; n is 1, 2, 3, 4, 5, 6, or 7, provided that the polyamine has at least three active amine hydrogen atoms.

* * * * *